(12) United States Patent
Mathew

(10) Patent No.: US 9,986,000 B1
(45) Date of Patent: May 29, 2018

(54) SYSTEMS AND METHODS FOR RECORDING AND STORING MEDIA CONTENT

(71) Applicant: ClearDoc, Inc., Jericho, NY (US)

(72) Inventor: Shijo Mathew, New Hyde Park, NY (US)

(73) Assignee: CLEARDOC, INC, Jericho, NY (US)

( * ) Notice: Subject to any disclaimer, the term of this patent is extended or adjusted under 35 U.S.C. 154(b) by 0 days. days.

(21) Appl. No.: 15/626,776

(22) Filed: Jun. 19, 2017

Related U.S. Application Data

(60) Provisional application No. 62/445,414, filed on Jan. 12, 2017.

(51) Int. Cl.
| | |
|---|---|
| *H04N 7/14* | (2006.01) |
| *H04L 29/06* | (2006.01) |
| *H04N 7/15* | (2006.01) |
| *H04N 21/233* | (2011.01) |
| *H04N 21/234* | (2011.01) |

(52) U.S. Cl.
CPC .......... *H04L 65/403* (2013.01); *H04N 7/147* (2013.01); *H04N 7/148* (2013.01); *H04N 7/15* (2013.01); *H04N 21/233* (2013.01); *H04N 21/234* (2013.01)

(58) Field of Classification Search
CPC .......... H04N 7/147; H04N 7/15; H04N 7/142; H04N 7/152; H04N 7/157; H04N 21/4223; H04N 7/148; H04N 7/155; H04N 2007/145

USPC ........................................... 348/14.01, 14.08
See application file for complete search history.

(56) References Cited

U.S. PATENT DOCUMENTS

| | | | |
|---|---|---|---|
| 9,014,661 B2 | 4/2015 | deCharms | |
| 9,124,763 B2 | 9/2015 | Humphries | |
| 2004/0207724 A1* | 10/2004 | Crouch | H04L 29/06027 348/14.09 |
| 2012/0162348 A1* | 6/2012 | Choi | H04L 1/0014 348/14.02 |
| 2015/0109399 A1* | 4/2015 | Kuscher | H04N 7/15 348/14.02 |
| 2016/0063893 A1 | 3/2016 | Kanuganti et al. | |
| 2016/0173686 A1 | 6/2016 | Jai | |
| 2016/0364616 A1 | 12/2016 | McLean et al. | |

(Continued)

*Primary Examiner* — Quoc D Tran
(74) *Attorney, Agent, or Firm* — McDonnell, Boehnen, Hulbert, & Berghoff LLP

(57) ABSTRACT

In an example, a method for recording media content using a mobile device includes establishing a communication session between a control system and the mobile device over a communication network and receiving, by a mobile device, a trigger signal transmitted by a control system over a communication network. The method also includes, responsive to the trigger signal, recording media content using a camera of the mobile device. The method further includes storing the recorded media content in a memory of the mobile device, terminating the recording, and, after terminating the recording, uploading the stored multimedia from the mobile device to a server. After uploading the media content to the server, the method includes receiving a signal indicating that the multimedia was successfully uploaded. The method still further includes, responsive to the signal, deleting the media content from the memory.

20 Claims, 11 Drawing Sheets

(56) References Cited

U.S. PATENT DOCUMENTS

2017/0070302 A1* 3/2017 Tuscano ................ H04H 20/04
2017/0078615 A1* 3/2017 Coen ..................... G06F 3/048

* cited by examiner admin
○ Online

♁ Employees — 410
🖉 Sessions
💾 Storage
🔎 Terms and Conditions — 402

HOME › SESSIONS › New
Sessions

| SESSIONED | EMPLOYEE NAME | DOCTOR NAME | START TIME — 416 | END TIME — 418 | CREATED — 420 | ACTION |
|---|---|---|---|---|---|---|
| 123 | admin | John | 2016-11-24 00:00: 20 | 2016-11-24 04:02: 23 | 11-24-2016 08:02:23 | 📄 |
| 13735858 | admin | Name | 2016-11-24 20:56:23 | 2016-11-24 20:56: 35 | 11-24-2016 13:56:36 | 📄 |
| 15205557 | admin | Test | 2016-12-06 11:07:03 | 2016-12-06 11:11: 10 | 12-06-2016 04:11:11 | 📄 |
| 18957476 | admin | Name | 2016-11-24 21:23:49 | 2016-11-24 21:24: 25 | 11-24-2016 15:24:44 | 📄 |
| 36037030 | admin | Name | 2016-11-25 02:09:41 | 2016-11-25 02:10: 42 | 11-24-2016 20:11:01 | 📄 |
| 37708184 | admin | Mike | 2016-12-04 17:22:01 | 2016-12-06 17:23: 49 | 12-06-2016 10:23:49 | 📄 |
| 38066424 | admin | Mike | 2016-12-06 17:32:00 | 2016-12-06 17:32: 53 | 12-06-2016 10:32:53 | 📄 |
| 75314403 | admin | Name | 2016-11-25 14:13:12 | 2016-11-25 14:14: 42 | 11-25-2016 07:54:43 | 📄 |
| 82010503 | admin | Mike | 2016-11-25 15:57:50 | 2016-11-25 15:54: 03 | 11-25-2016 08:58:03 | 📄 |
| 145618954 | admin | John Smith 1 | 2016-12-07 16:18:38 | 2016-12-07 16:40: 34 | 12-07-2016 16:40:34 | 📄 |
| 156071425 | admin | Mike | 2016-12-19 17:23:38 | 2016-12-19 17:25: 15 | 12-07-2016 16:25:15 | 📄 |
| 164445507 | admin | Try | 2016-12-29 00:21:22 | 2016-12-20 00:24: 02 | 12-19-2016 11:24:03 | 📄 |

Today | Yesterday | This Week | This Month | All    🔍 Search    ⊕ Create Session — 422

*Fig. 4A*

| 339550892 | admin | Alyssa | Test 123 | 720 | 12-21-2016 12:00:31 | ☐ | △ | ↲ | ✕ |
| 339550892 | admin | Alyssa | Test 1234 | 1080 | 12-21-2016 12:02:38 | ☐ | △ | ↲ | ✕ |
| 515133032 | admin | Apple Test | 123 | 720 | 12-23-2016 12:46:45 | ☐ | △ | ↲ | ✕ |
| 839389897 | Lindsey | Joe | tre4 | 720 | 12-15-2016 17:11:45 | ☐ | △ | ↲ | ✕ |

*Fig. 4B*

SYSTEMS AND METHODS FOR RECORDING AND STORING MEDIA CONTENT

CROSS-REFERENCE TO RELATED APPLICATION

This application claims the benefit of U.S. Provisional Application No. 62/445,414, filed Jan. 12, 2017, the contents of which is hereby incorporated by reference in its entirety.

FIELD

The present invention generally relates to systems and methods for recording and storing media content using a mobile device.

BACKGROUND

Recent advances in network and device technology allow the use of video communication. Such communication may take place over Internet-connected, mobile devices as bandwidth is now generally sufficient to stream video taken from cameras in mobile devices such as mobile phones, tablets, or personal computers. Mobile devices may also use cameras to record and store video content.

SUMMARY

In an example, a method of facilitating recording of media content by a mobile device is described. The method includes establishing a communication session between a control system and the mobile device over a communication network. The method also includes receiving, at the control system, video content and audio content from the mobile device during the communication session. The method further includes triggering, using the control system, a recording of media content by the mobile device during the communication session. The media content recorded by the mobile device includes a portion of the video content and the audio content. The mobile device stores the media content in a data storage device. The method also includes, after the recording is completed, receiving the media content at the control system. The method still further includes determining that the media content was successfully received by the control system and, responsive to determining that the media content was successfully received by the control system, transmitting a first control signal from the control system to the mobile device to cause the mobile device to delete the media content from the data storage device.

In another example, a method is described for recording media content using a mobile device. The method includes establishing a communication session between a control system and the mobile device over a communication network and receiving, by a mobile device, a trigger signal transmitted by a control system over a communication network. The method also includes, responsive to the trigger signal, recording media content using a camera of the mobile device. The method further includes storing the recorded media content in a memory of the mobile device, terminating the recording, and, after terminating the recording, uploading the stored multimedia from the mobile device to a server. After uploading the media content to the server, the method includes receiving a signal indicating that the multimedia was successfully uploaded. The method still further includes, responsive to the signal, deleting the media content from the memory.

In another example, a system for recording of media content by a mobile device includes a camera configured to capture video, a microphone configured to capture audio, and a processor communicatively coupled to the camera and the microphone. The processor is configured to: (i) establish a communication session between the control system and the mobile device over a communication network, (ii) transmit, to the mobile device, the video captured by the camera and the audio captured by the microphone during the communication session, (iii) receive video content and audio content from the mobile device during the communication session, and (iv) trigger a recording of media content by the mobile device during the communication session. The media content recorded by the mobile device includes a portion of the video content and the audio content. The mobile device stores the media content in a data storage device. The processor is further configured to: (v) after the recording is completed, receive the media content, and (vi) responsive to the media content being received, transmit a control signal from the control system to the mobile device to cause the mobile device to delete the media content from the data storage device.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 4A illustrates a screenshot of a user interface for a control system according to an example embodiment.

FIG. 4B illustrates a screenshot of a user interface for a control system according to an example embodiment.

DETAILED DESCRIPTION

Figure 1:
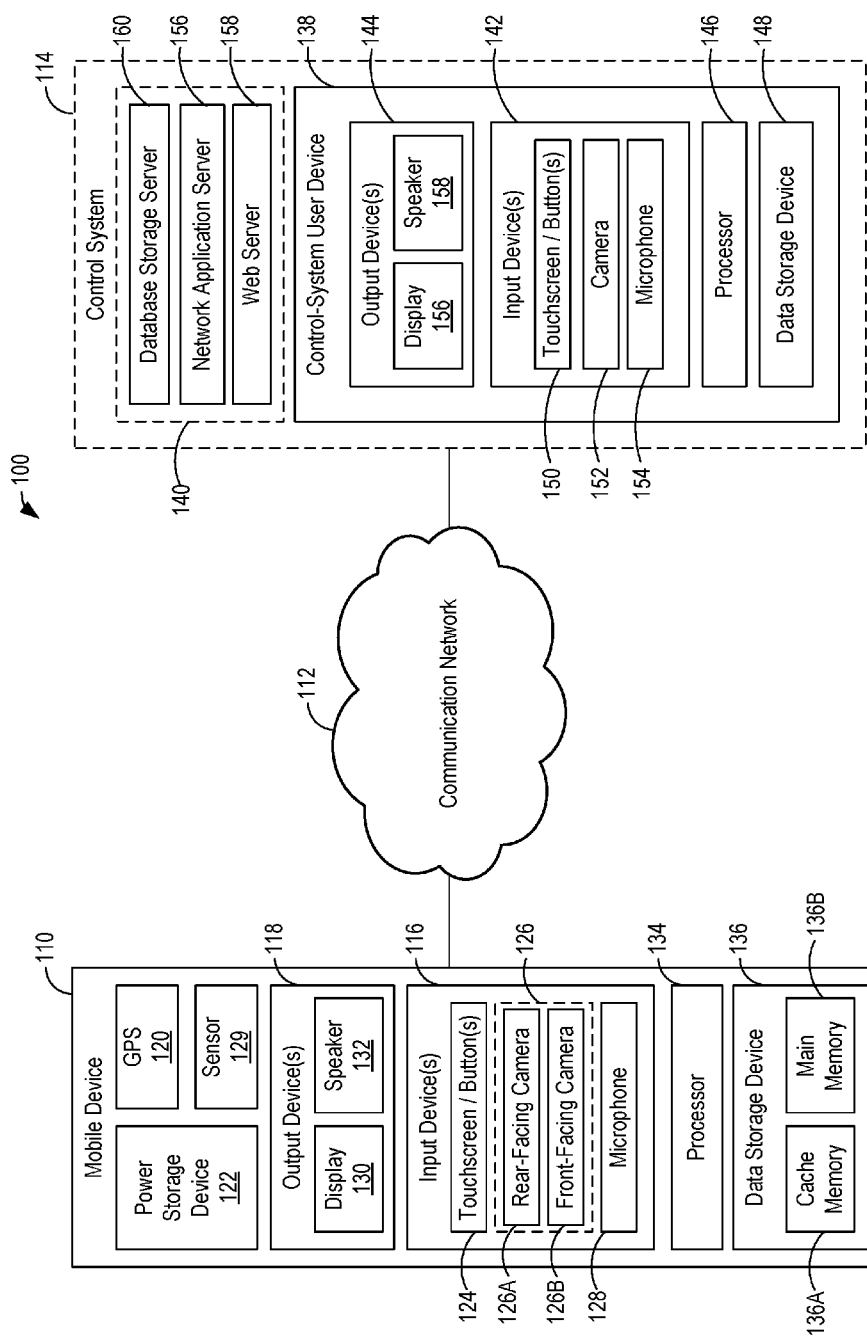
FIG. 1 illustrates a simplified block diagram of a system for recording and storing media content according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art. For instance, elements, arrangements, and functions may be added, removed, combined, distributed, or otherwise modified. In addition, it will be understood that functions described here as being performed by one or more entities may be implemented in various ways, such as by a processor executing software instructions for instance.

I. Overview

The systems and methods of the present disclosure provide for recording media content using a mobile device. Recording media content such as, e.g., video content using a mobile device presents a number of challenges. As an example, it can be challenging for a user of the mobile device to properly frame himself or herself in the video when recording video unassisted. For instance, it can be challenging for the user to position the mobile device at the right distance away from himself or herself such that the mobile device captures a wide enough angle without creating audio issues. Additionally, for instance, when using a camera on a backside of the mobile device, the user cannot see himself or herself on the display while recording the video. As such, the user may have difficulties centering himself or herself in the video. This may cause the user to repeatedly readjust the mobile device and re-record the video multiple times until the user is properly framed in the video.

Also, for example, it can be challenging to record video using mobile devices due to the relatively limited storage capacity of some mobile devices. For instance, some mobile devices record and store video in compressed formats that diminish the quality of the media content so as to conserve the limited storage capacity of such mobile devices. The diminished quality of the video can further limit the ability to later edit the video. In many professional contexts, recording video with diminished quality and/or limited editing capabilities is not satisfactory.

Yet, even when a mobile device can record and store video in higher quality formats, the user may be discouraged from recording relatively lengthy videos due to the relatively large size of the file that is required to store the video on the mobile device. Similarly, the user may be discouraged (or prevented) from recording and storing multiple videos of relatively large size due to the limited storage capacity of the mobile device.

The systems and methods of the present disclosure can beneficially address, among other things, one or more of the challenges described above. Within examples, the systems and methods of the present disclosure provide for establishing a communication session between a control system and a mobile device, recording media content by the mobile device during the communication session, storing the recorded media content in the memory of the mobile device, and after the recording is completed, uploading the recorded media content to the control system and deleting the recorded media content from the mobile device. In some aspects, the mobile device automatically deletes the recorded media content upon successful upload to the control system. This can, among other things, allow the mobile device to record the media content in a high quality, uncompressed format as the mobile device only temporarily stores the media content in local memory. The high quality media content can then be later edited and/or retrieved to achieve polished, professional quality media content.

According to some advantageous aspects, the control system and mobile device are configured to permit the control system to control and/or automate operation of the mobile device before, during, and/or after the recording process. For example, during the communication session, the control system can provide feedback to the mobile device to allow the user to make adjustments that improve the media content (e.g., by better positioning the user relative to the mobile device, adjusting light conditions, and/or adjusting camera settings). Additionally, for example, the control system can trigger the mobile device to initiate and/or terminate the recording of the media content so that the user can be better positioned at the start and end of the recording.

Accordingly, the systems and methods of the present application can provide for achieving professional, studio-quality video using a mobile device such as, for example, a smartphone. This can allow a user to quickly, conveniently record high quality video in the comfort of his or her own office, home, or other locale without the burden of expensive video camera and lighting equipment.

In one example, the systems and methods described in the present disclosure provide for recording and storing media content relating to medical advice. For instance, an organization operating the control system can interview doctors via a mobile device. The interviews can be recorded via the camera of the mobile device of the doctors at a remote location. Such interviews could be medical advice offered by the doctor for storage and access later by the organization that operates the control system.

II. Example System

Referring to FIG. 1, a simplified block diagram of a system for recording media content using a mobile device is illustrated according to an example embodiment. As shown in FIG. 1, the system 100 includes a user mobile device 110 communicatively coupled over a communication network 112 (e.g., via a wired and/or wireless connection) to a control system 114. As described above, the mobile device 110 and the control system 114 are configured to, among other things, (i) establish a communication session, which can take the form of a streaming video session, (ii) record media content on the mobile device 110 during the communication session, (iii) upload the media content from the mobile device 110 to the control system 114, and (iv) delete the media content from a data storage unit of the mobile device 110. Additionally, as described above, the control system 114 is configured to provide commands to the mobile device 110 to control operation of the mobile device before, during, and/or after recording the media content.

A. Example Mobile Device

In general, the mobile device 110 includes various components for streaming video and/or audio content with the control system 114 over the communication network 112, and for recording and storing the media content in a local data storage device 136. As examples, the mobile device 110 can be a portable electronic device such as a cellular telephone, a smartphone, a display pager, a radio frequency (RF) device, an infrared (IR) device, a global positioning satellite (GPS) device, a personal digital assistant (PDA), a handheld computer, a wearable computer, a tablet computer, and/or an integrated device combining one or more of the preceding devices.

As also shown in FIG. 1, the mobile device 110 includes one or more input devices 116, output devices 118, a GPS device 120, and a power storage device 122. The input devices 116 are configured to receive an input from the user of the mobile device 110. For example, the input device 116 can include a touchscreen and/or button(s) 124, camera(s) 126, and a microphone 128. In some implementations, the camera(s) 126 can include a rear-facing camera 126A on a backside of the mobile device 110 and a front-facing camera 126B on a front side of the mobile device 110. The touchscreen and/or button(s) 124 can receive touch inputs based on a user contact with the mobile device 110, the camera(s) 126 can capture video and/or still images, and the microphone 128 can capture audio. The mobile device 110 can also include additional or alternative one or more sensors 129 such as, for instance, a gyroscope, an accelerometer, a battery level sensor, and/or a temperature sensor.

The output devices 118 can include a display device 130 and a speaker device 132. The display device 130 can display information including, for example, video and images captured by the camera(s) 126 and/or received from the control system 114. In an example, the display device 130 can be located on the front side of the mobile device 110 (i.e., on the same side of the mobile device 110 as the front-facing camera 126B). The speaker device 132 can output audio to the user. The output devices 122 can additionally or alternatively include additional output devices (not shown) such as, for example, an indicator light.

The power storage device 122 can include a rechargeable battery. The GPS device 120 can allow the mobile device 110 to receive positioning data so as to determine the location of the mobile device 110.

As also shown in FIG. 1, the mobile device 110 can include a processor 134. The processor 134 can be implemented as a combination of hardware and software elements. The hardware elements may include combinations of operatively coupled hardware components, including microprocessors, communication/networking interfaces, memory, signal filters, circuitry, etc. The processor 134 can be configured to perform operations specified by the software elements, e.g., computer-executable code stored on computer readable medium (e.g., the data storage device 136). The processor 134 can be implemented in any number of physical devices/machines.

The physical devices/machines can be implemented by the preparation of integrated circuits or by interconnecting an appropriate network of conventional component circuits, as is appreciated by those skilled in the electrical art(s). The physical devices/machines, for example, may include field programmable gate arrays (FPGA's), application-specific integrated circuits (ASIC's), digital signal processors (DSP's), etc. The physical devices/machines may reside on a wired or wireless network, e.g., LAN, WAN, Internet, cloud, near-field communications, etc., to communicate with each other and/or other systems, e.g., Internet/web resources.

Appropriate software can be readily prepared by programmers of ordinary skill based on the teachings of the example embodiments, as is appreciated by those skilled in the software arts. Thus, the example embodiments are not limited to any specific combination of hardware circuitry and/or software. Stored on one computer readable medium or a combination of computer readable media, the computing systems may include software for controlling the devices and subsystems of the example embodiments, for driving the devices and subsystems of the example embodiments, for enabling the devices and subsystems of the example embodiments to interact with a human user (user interfaces, displays, controls), etc. Such software can include, but is not limited to, device drivers, operating systems, development tools, applications software, etc.

The local data storage device 136 can be a computer readable medium (CRM), which can include the computer program product(s) for performing all or a portion of the processing performed by the example embodiments. Computer program products employed by the example embodiments can include any suitable interpretable or executable code mechanism, including but not limited to complete executable programs, interpretable programs, scripts, dynamic link libraries (DLLs), applets, etc. The processor 118 can include, or be otherwise combined with, computer-readable media. Some forms of computer-readable media may include, for example, a hard disk, any other suitable magnetic medium, CD-ROM, CDRW, DVD, any other suitable optical medium, RAM, PROM, EPROM, FLASH-EPROM, any other suitable memory chip or cartridge, a carrier wave, or any other suitable medium from which a computer can read. In the example shown in FIG. 1, the data storage device 136 includes a cache memory 136A and a main memory 136B; however, the data storage device 136 can include a greater or lesser quantity of computer-readable media for storing data.

In one implementation, the mobile device 110 is web-enabled and can operate browser software for the presentation of web pages to the user. As exampled below, the mobile device 110 can include a browser application enabled to receive and to send wireless application protocol messages (WAP), and/or wired application messages, and the like.

The mobile device 110 can also include at least one client application that is configured to receive control data and/or content from the control system 114 via the communication network 112. In one example, the client application stored by the data storage device 136 can include a local streaming video function, which creates interface graphics on the display 130 and interfaces with the browsing application. Additionally, for instance, the client application can include a capability to provide and receive textual content, graphical content, video content, audio content, and the like. In this example, the streaming video application may be preloaded on the mobile user device 110, or may be offered as an application that may be downloaded to the mobile user device 110 from a network device such as the control system 114. It should be understood that other forms of applications may incorporate the principles explained herein.

In some examples, the processor 134 can include a CODEC, which facilitates encoding and decoding signals for audio content captured by the microphone 128 and/or received from the control system 114 for output by the speaker device 132. Additionally, in some examples, the mobile device 110 can be configured to communicate and/or receive a message, such as through a Short Message Service (SMS), direct messaging (e.g., TWITTER), e-mail, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between or with another computing device, and the like.

B. Example Control System

In the example of FIG. 1, the control system 114 includes a control-system user device 138 and one or more servers 140. The control-system user device 138 can facilitate communications between an operator of the control system 114 and the mobile device 110 (including the user of the mobile device 110). As shown in FIG. 1, the control-system user device 138 can include one or more input devices 142 for receiving inputs from the operator of the control system 114, output devices 144 for providing outputs to the operator of the control system 114, processors 146, and data storage devices 148.

As examples, the input devices 142 can include a touch input device 150 (e.g., a touchscreen, buttons, a keyboard, and/or a mouse) a camera 152, and/or a microphone 154. The camera 152 can capture video of the operator, which can be transmitted by the control system 114 to the mobile device 110. The microphone 154 can capture audio, which can be transmitted by the control system 114 to the mobile device 110.

Also, as examples, the output devices 144 can include a display device 156 and a speaker device 158. The display device 156 can display, among other things, video content and/or still images received by the control system 114 from the mobile device 110. The speaker device 158 can output, among other things, audio content received by the control system 114 from the mobile device 110.

The processor 146 can be implemented as a combination of hardware and software elements in a manner similar to that described above with respect to the processor 134. As such, the hardware elements may include combinations of operatively coupled hardware components, including microprocessors, communication/networking interfaces, memory, signal filters, circuitry, etc. The processor 146 can be configured to perform operations specified by the software elements, e.g., computer-executable code stored on computer readable medium (e.g., the data storage device 136). Similarly, the data storage device 148 can be implemented as any of the computer-readable memory configurations described above. Further, the processor 146 and/or the data storage device 148 can be implemented in any number of physical devices/machines (including in one or more of the servers 140).

The servers 140 can be configured to facilitate aspects of the client application described above including, for example, establishing a communication session between the control system 114 and the mobile device 110, transmitting control signals and commands to operate the mobile device 110 by the control system 114, and/or storing media content recorded and uploaded by the mobile device 110. In one implementation, the servers 140 include a network application server 156, a web server 158, and a database storage server 160. However, in other implementations, the servers 140 can include additional or alternative servers. Further, in other implementations, aspects of the servers 140 described below can be incorporated in and/or performed by the control-system user device 142. Accordingly, principles and advantages of distributed processing, such as redundancy, replication, and the like, also can be implemented, as desired, to increase the robustness and performance of the devices and systems of the control system 114.

Within examples, the control system 114 can create a connection using programmable video API, VoIP, and/or mobile SDK to send a call to the mobile device 110. The call can occur while maintaining a constant connection via VoIP and or programmable video API with the ability to directly see and talk to the user of the remote device without loss of connection during call transmissions. In other words, the control system 114 and the mobile device 110 can establish and maintain a live video stream in real-time to exchange video content and/or audio content via the input devices 116, 142 and the output devices 118, 144.

As described in further detail below, during the communication session, the control system 114 can transmit control signals to the mobile device 110 to cause the mobile device 110 to carry our various operations. For example, the control system 114 can transmit control signals to remotely to start recording of media content by the camera 126 of the mobile device 110 into the data storage device 136, to remotely stop the recording, to upload uncompressed camera output (video or image) to the control system 114 (e.g., the database server 160), to remotely delete said recording and/or file from the data storage device 136, remotely adjust video resolution of the mobile device 110, remotely monitor a volume level of the mobile device 110, and/or remotely cancel a recording in progress.

C. Example Communications Network

The communication network 112 is configured to allow communications between one computing device with another computing device. As an example, the communication network 112 can include an interconnected set of local area networks (LANs), including those based on differing architectures and protocols, a router and/or gateway device acts as a link between LANs, enabling messages to be sent between computing devices. Also, communication links within LANs can include a twisted wire pair or coaxial cable, while communication links between networks may utilize analog telephone lines; full or fractional dedicated digital lines including T1, T2, T3, and T4; Integrated Services Digital Networks (ISDNs); Digital Subscriber Lines (DSLs); wireless links including satellite links; or other communication links known to those of ordinary skill in the art. Furthermore, remote computers and other related electronic devices can be remotely connected to either LANs or wide area networks (WANs) via a modem and temporary telephone link.

The communication network 112 can additionally or alternatively include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The communication network 112 can also include an autonomous system of terminals, gateways, routers, and the like connected by wireless radio links or wireless transceivers. These connectors may be configured to move freely and randomly and organize themselves arbitrarily, such that the topology of the communication network 112 may change rapidly and arbitrarily.

The communication network 112 can further employ a plurality of access technologies including 2nd (2G), 2.5, 3rd (3G), 4th (4G) generation radio access for cellular systems; WLAN; Wireless Router (WR) mesh; and the like. Access technologies such as 2G, 3G, 4G, and future access networks may enable wide area coverage for the mobile device 110, with various degrees of mobility. For example, the communication network 112 can enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. The network 108 may also be constructed for use with various other wired and wireless communication protocols, including TCP/IP, UDP, SIP, SMS, RTP, WAP, CDMA, TDMA, EDGE, UMTS, GPRS, GSM, UWB, WiMax, IEEE 802.11x, and the like. In essence, the communication network 112 can include any wired and/or wireless communication mechanisms by which information may travel between one computing device and another computing device, network, and the like.

III. Example Operations

In operation, a process for recording and/or storing media content begins by establishing a communication session between the mobile device 110 and the control system 114. In an example, the communication session can be established using an identification number assigned to the communication session. For instance, the control system 114 can generate the identification number and communicate the identification number to the mobile device 110. The mobile device 110 can then use the identification number to login to the communication session with the control system 114. In some implementations, the identification number can unique for each communication session. In additional or alternative examples, the mobile device 110 can be configured to generate and transmit the identification number to the control system 115 to initiate the communication session. In the examples above, the mobile device 110 and/or the control system 114 can transmit the identification number via a data signal over the communication network 112 and/or via a communication outside the communication network (e.g., via postal mail and/or an in-person oral conversation).

The communication session can be a streaming video session between the mobile device 110 and the control system 114. As such, during the communication session, the mobile device 110 can capture video content and audio content using the camera 126 and the microphone 128, respectively, and transmit the captured video content and audio content to the control system 114. The control system 114 can output to the operator of the control system 114 the video content and the audio content received from the mobile device 110. The control system 114 can also capture video content and/or audio content using the camera 152 and the microphone 154, and transmit the captured video content and audio content to the mobile device 110. The mobile device 110 can output to the user of the mobile device 110 the video content and/or audio content received from the control system 114. In this way, a user of the mobile device 110 can communicate with an operator of the control system 114 to carry out various functions described in further detail below.

Figure 2A:
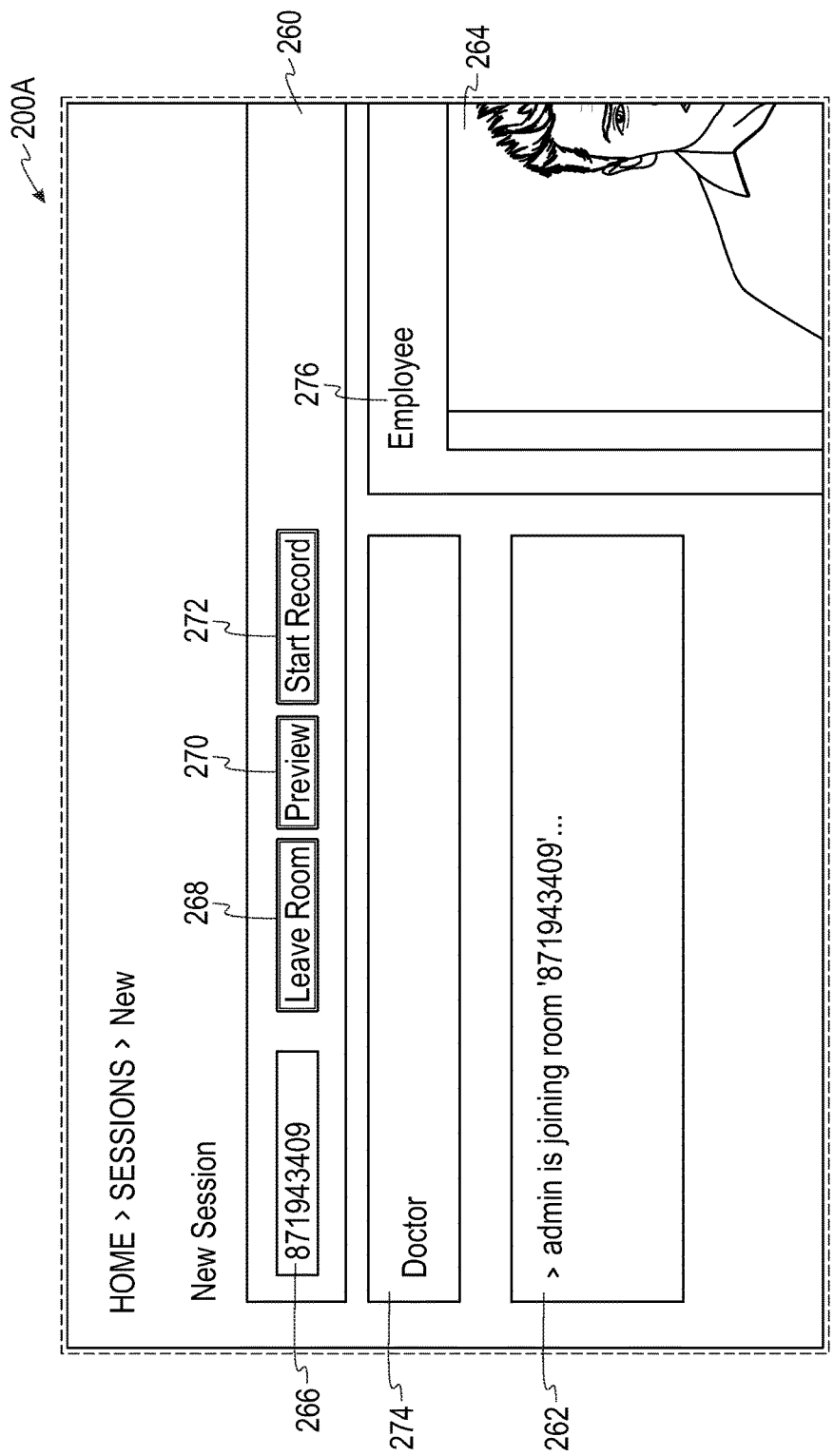
FIG. 2A illustrates a screenshot of a user interface for a control system according to an example embodiment.

FIG. 2A depicts a partial screenshot of a user interface 200A that can be displayed on the display device 156 of the control system 114 to establish the communication session according to an example embodiment. As shown in FIG. 2A, the user interface 200A includes a control portion 260, a status window 262, and a video window 264. The control portion 260 includes an identification field 266, which displays the identification number for the communication session. In this example, the control system 114 can create a new communication session by generating and providing a unique 9-digit number to the mobile device 110. In this way, the identification number can act like a room to establish the communication session between the control device 114 and the mobile device 110. In additional or alternative examples, the identification number can have a lesser or greater number of digits and/or the identification number can be alphanumeric.

The control portion 260 also includes a plurality of selectable user inputs. For example, in FIG. 2A, the control portion 260 includes a leave room button 268, a preview button 270, and a start record button 272. Responsive to a selection of the leave room button 268, the control system 114 terminates the communication session. Responsive to a selection of the preview button 270, the control system 114 causes the camera 126 of the mobile device 110 to capture a still image within a field of view of the camera 126 to allow for better framing of the video. Responsive to a selection of the start record button 272, the control system 114 causes the mobile device 110 to start the recording of media content by the mobile device during the communication session.

Additionally, as shown in FIG. 2A, the status window 262 can display messages relating to the status of the communication session. For instance, the status window 262 can display whether the mobile device 110 and/or the control system 114 has joined the communication session. In FIG. 2A, the status window 262 indicates that the operator has joined a communication session identified by identification number "871943489," but the user of the mobile device 110 has not yet joined.

Also, in FIG. 2A, the video window 264 displays the video content captured by the camera 152 of the control system 114. The video window 264 includes an operator-name field 276 that displays the name of the operator of the control system 114 participating in the communication session (e.g., "Employee" in FIG. 2A). A user-name field 274 displays the name of the user of the mobile device 110 (e.g., "Doctor" in FIG. 2A) that will join the communication session.

Figure 2B:
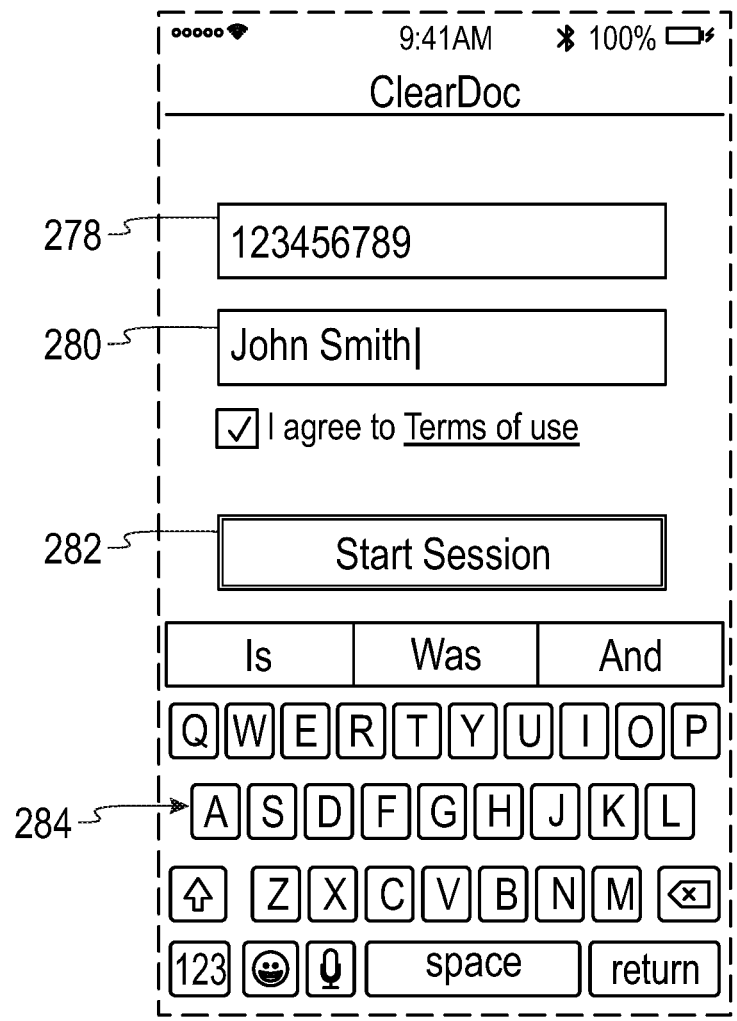
FIG. 2B illustrates a screenshot of a user interface for a mobile device according to an example embodiment.

FIG. 2B depicts a partial screenshot of a user interface 200B that can be displayed on the display device 130 of the mobile device 110 to establish the communication session according to an example embodiment. As shown in FIG. 2B, the user interface 200B includes an identification field 278 for receiving the identification number assigned to the communication session. In an example, the user of the mobile device 110 can enter the identification number in the identification field 278 using one of the input devices 116. For instance, the mobile user device 110 can display a keyboard 284 to allow the user to enter text via the touchscreen 124. In one implementation, the mobile device 110 can receive the identification number from the application server 102 when the session is initiated by the control-system user device 138.

Also, as shown in FIG. 2B, the user interface 200B includes a user-name field 280 in which the user can enter their name. The name entered in the user-name field 280 can be displayed in the user-name field 274 in FIG. 2A. The user interface 200B also includes a start session button 282. Responsive to a selection of the start session button 282, the mobile device 110 joins the communication session corresponding to the identification number with the control system 114. The communication session is established when both the mobile device 110 and the control system 114 have joined the communication session corresponding to the identification number.

Figure 2C:
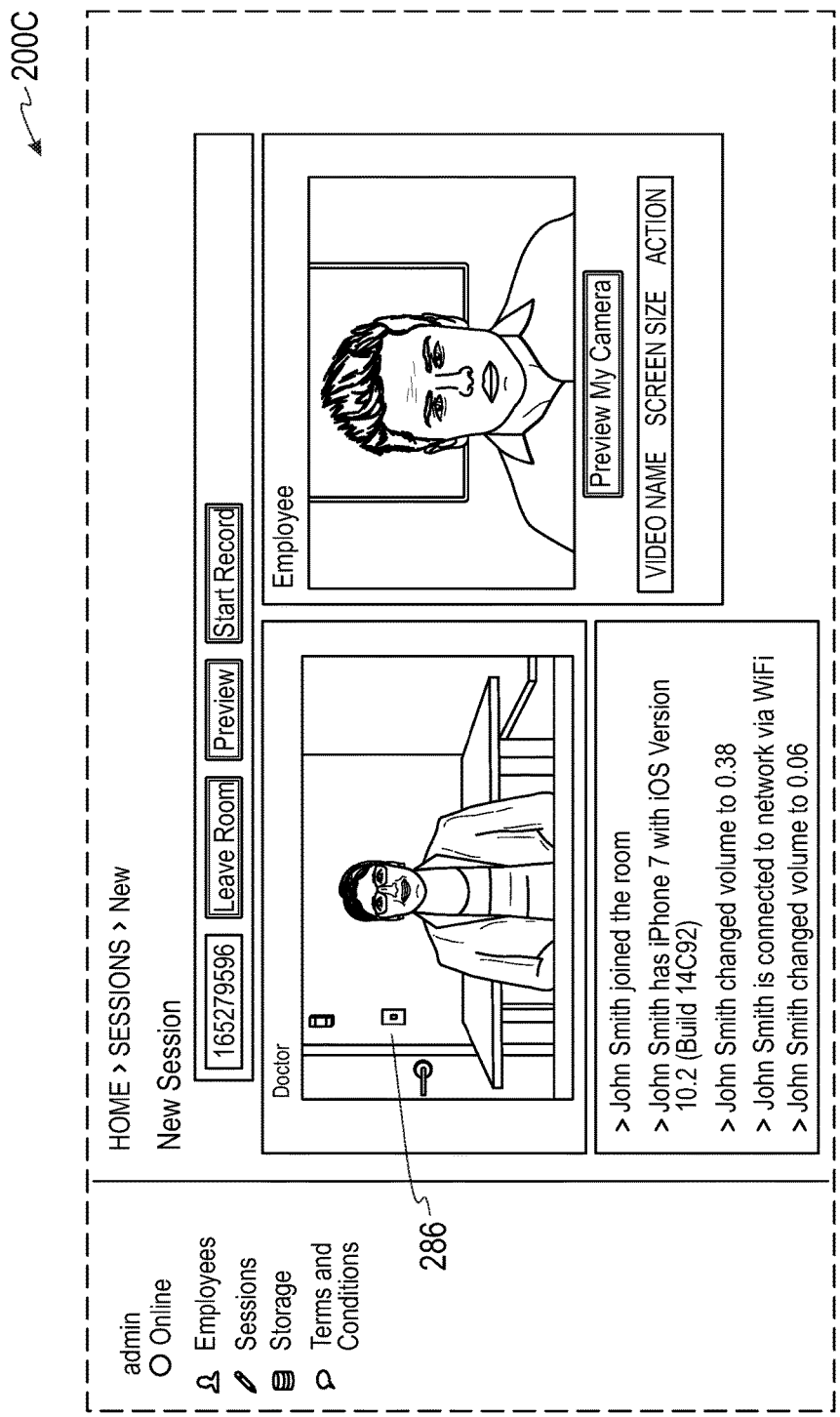
FIG. 2C illustrates a screenshot of a user interface for a control system according to an example embodiment.

FIG. 2C depicts a partial screenshot of the user interface 200C that can be displayed by the display device 156 of the control system 114 during the communication session according to an example embodiment. As shown in FIG. 2C, the user interface 200A is substantially the same as the user interface 200C shown in FIG. 2A, except the user interface 200C additionally includes a user-video window 286. The user-video window 286 displays the video content captured by the camera 126 of the mobile device 110 and received by the control system 114 during the communication session. In this way, the control system 114 can simultaneously display both the video content stream captured by the mobile device 110 and the video content stream captured by the control system 114 in the user interface 200C.

Figure 2D:
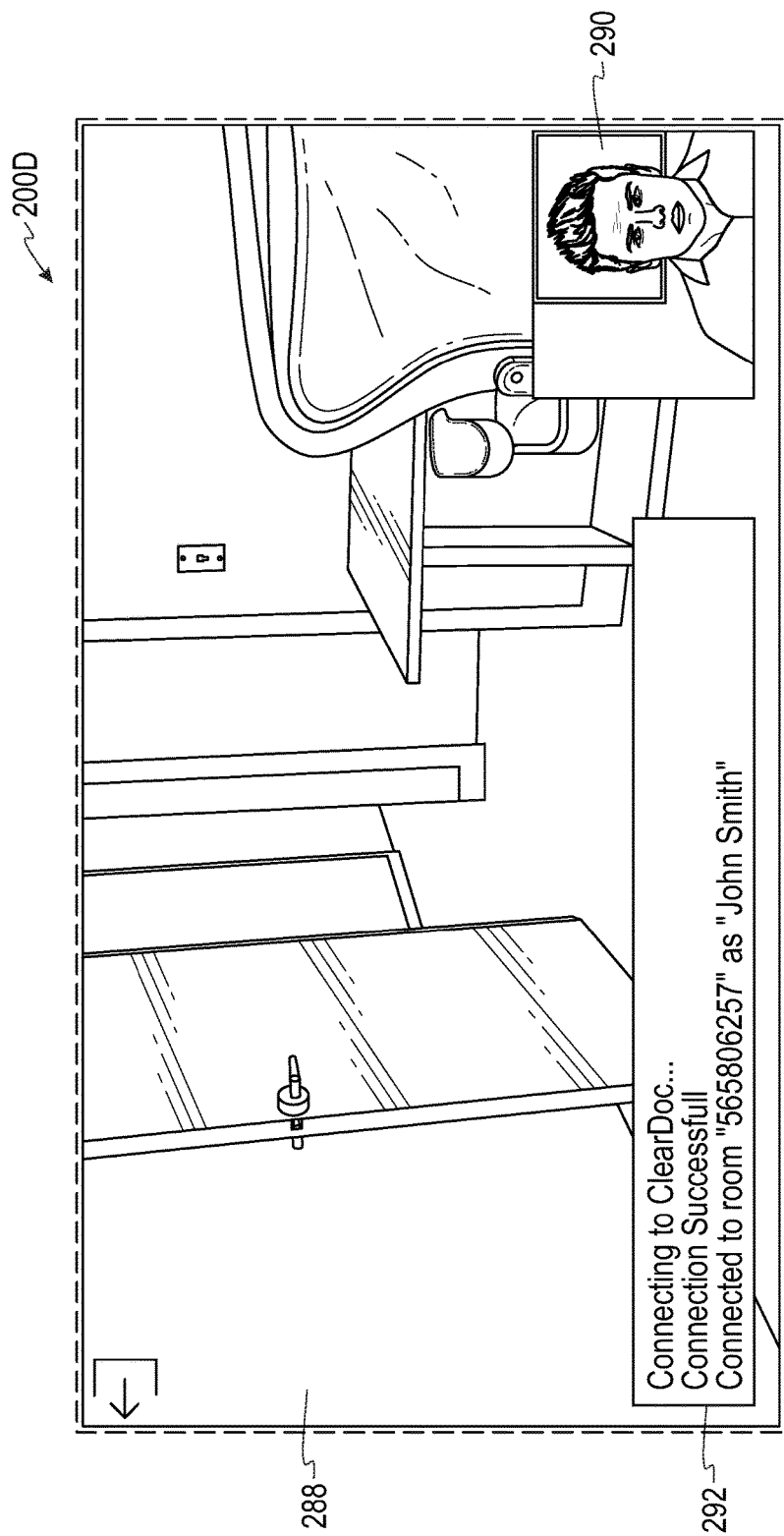
FIG. 2D illustrates a screenshot of a user interface for a mobile device according to an example embodiment.

FIG. 2D depicts a partial screenshot of the user interface 200D that can be displayed by the display device 130 of the mobile device 110 during the communication session according to an example embodiment. For example, responsive to a selection of the start session button 282 on the user interface 200B of FIG. 2B, the mobile device 110 can transition to the full screen user interface 200D shown in FIG. 2D. As shown in FIG. 2D, the user interface 200D includes a full screen video window 288, which displays the video content captured by the camera 126 of the mobile device 110 in real-time. The user interface 200D also includes an overlaid window 290, which displays the video content captured by the camera 152 of the control system 114 in real-time. In this way, the mobile device 110 can simultaneously display both the video content stream captured by the mobile device 110 and the video content stream captured by the control system 114 in the user interface 200D.

In FIG. 2D, a status area 292 displays status messages relating to the operation of the application and the communication session such as, for example, the status of connection, the room identification, the name of the user, and/or the name of the operator.

As noted above, during the communication session, the mobile device 110 and the control system 114 transmit and receive video content and/or audio content to each other in real-time. During an initial portion of the communication session, the operator of the control system 114 can communicate with the user of the mobile device 110 to prepare the user and/or the mobile device 110 for recording the media content.

For instance, the operator of the control system 114 can view the video content captured by the camera 126 of the mobile device 110 and evaluate the video content based on one or more quality criteria to determine whether to trigger the recording of the media content. As examples, the quality criteria can relate to a position of the user relative to a center of the frame of the video content, a distance of the user relative to the camera 126, a quality of the audio content, a volume level of the audio content, a lighting condition in an environment in which the mobile device 110 is positioned, and/or a background in the frame of the video content (e.g., whether there are objects that may be moved out of, into, or within a frame of the video content). Based on the evaluation, the operator of the control system 114 can provide oral and/or visual feedback to help the user of the mobile device 110 improve one or more conditions for recording the media content. As described in detail below, the control device 114 can additionally or alternatively transmit one or more control signals to control operation of the mobile device 110 and thereby facilitate preparation for recording the media content.

In some instances, the operator of the control system 114 may have relatively greater experience with recording media content than the user of the mobile device 110. As such, the communication session can provide allow the user to receive professional advice and expertise to achieve a higher quality recording than the user would otherwise be able to achieve by himself or herself. Additionally, for example, the audio feedback provided to the user may be beneficial in a scenario in which the user of the mobile device 110 has arranged the mobile device 110 such that the backside of the mobile device 110 faces the user (e.g., so as to use the rear-facing camera 126A) and, thus, the user cannot see himself or herself in the display 130 of the mobile device 110 while preparing to record the media content.

When the mobile device 110 and/or the user of the mobile device 110 are prepared, the control system 114 transmits a control signal to the mobile device 110 to trigger the recording of the media content by the mobile device 110. For example, the control system 114 can transmit the control signal to the mobile device 110 to trigger the recording responsive to a selection of the start record button 272 shown in FIGS. 2A and 2C.

Remotely triggering the recording using the control system 114 provides a number of benefits. For instance, the user of the mobile device 110 can be properly positioned in the frame of the video at the moment the recording is triggered. By contrast, when the user of the mobile device 110 manually triggers the recording, the user may have to move to the mobile device 110, press a button, and return to the proper position such that the beginning of the recording captures the user moving from the mobile device 110 back into position. This may be undesirable and may require more extensive editing to the recorded media content. Additionally, by remotely triggering the recording using the control system 114, the user of the mobile device 110 can focus on their presentation as opposed to operating the mobile device 110. This streamlines the recording process, allowing the user to present in clearer, more polished, and more convenient manner.

The media content recorded by the mobile device 110 (e.g., by the camera 126 and/or the microphone 128) includes a portion of the video content and the audio content transmitted to the control system 114 during the communication session. Stated differently, the mobile device 110 records the media content by storing, in the data storage device 136, the video content and audio content transmitted by the mobile device 110 to the control system 114 during the communication session. In an implementation, the mobile device 110 records the media content by storing the media content in the cache memory 136A of the mobile device 110. One benefit to storing the media content in the cache memory 136A is that the excess capacity of the main memory 136B may not be great enough to store relatively large sized video files (e.g., when the main memory 136B stores other application data, pictures, videos, etc.). In an additional or alternative implementation, the mobile device 110 can store the media content in the main memory 136B.

Figure 2E:
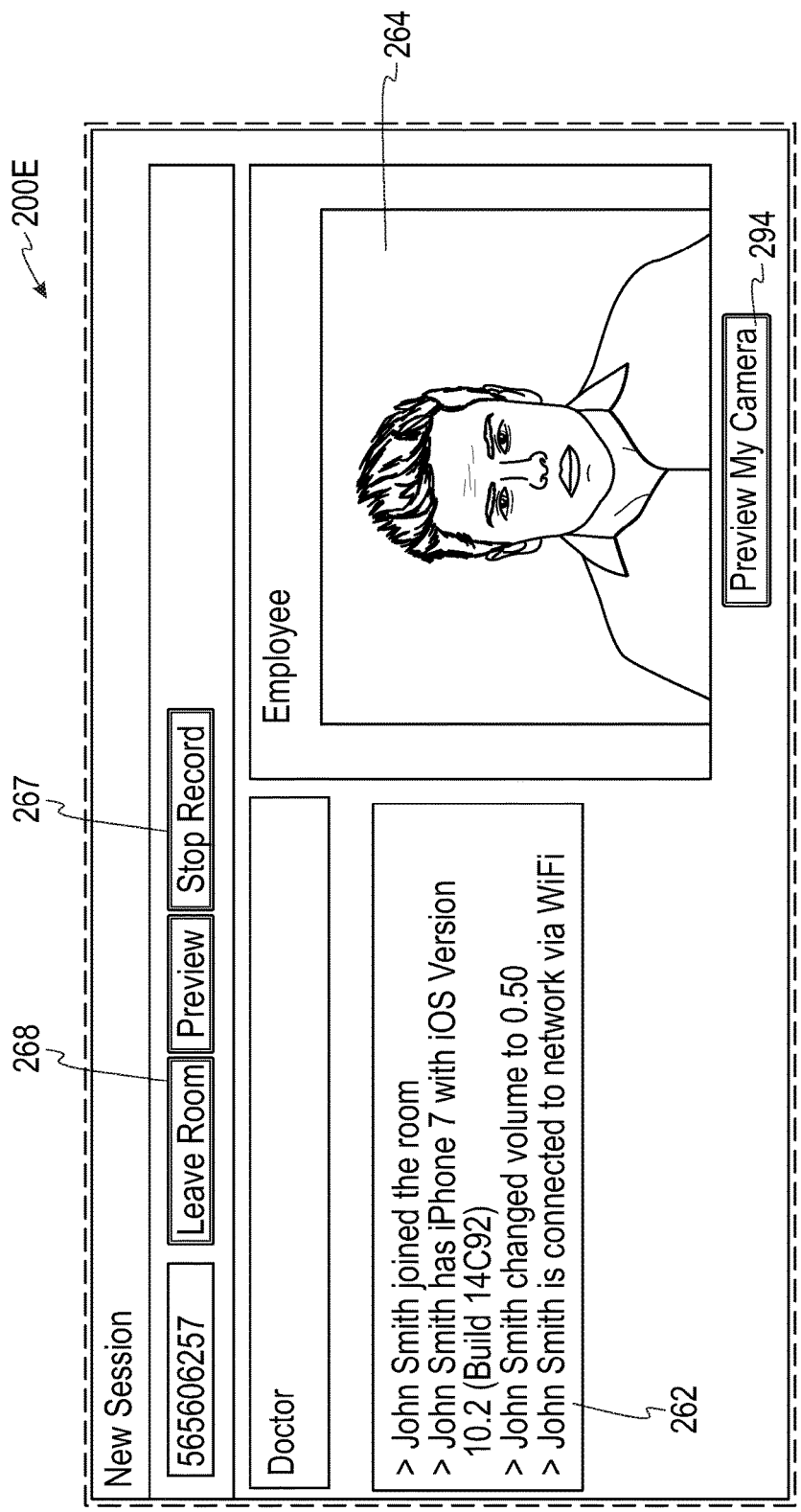
FIG. 2E illustrates a screenshot of a user interface for a control system according to an example embodiment.

FIG. 2E depicts a user interface 200E that can be displayed by the display device 156 during the recording of the media content according to an example embodiment. The user interface 200E is substantially similar to the user interface 200C of FIG. 2C, except the video window 326 has been hidden. The user interface 200D can display the video window 326 to show the view from the camera 126 of the mobile device 110 responsive to a selection of the preview my camera button 294. This can help to achieve proper framing of user in the recorded media content.

Also, as shown in FIG. 2E, the status window 262 displays status messages that show various operational details of the application. For example, the status messages in the status window 262 can include details relating to the communication session such as the connection status, recording status, device type and OS version of the mobile device, connectivity type (e.g., WiFi), volume status and application build status.

The user interface 200E can include additional or alternative selectable buttons in additional or alternative examples. For example, the user interface 200E can include a button that can be selected to capture a still image or screenshot of a frame of video content displayed in the video window 326. As additional or alternative examples, the user interface 200E can include selectable buttons to allow the control system 114 to remotely delete the recording or video file from the data storage device 136 of the mobile device 110, remotely adjust video resolution of video content captured by the mobile device 110, remotely monitor the volume level of the audio content captured by the mobile device 110, remotely cancel a recording session in progress and delete the recorded media content from the data storage device 136 of the mobile device 110.

After the recording of the media content is completed, the mobile device 110 can prepare the stored media content for upload. As one example, in FIG. 2E, responsive to a selection of a stop recording button 267, the control system 114 can transmit a control signal to the mobile device 110 to stop or terminate the recording. Responsive to the termination of the recording, the mobile device 110 prepares the stored media content for upload. In this example, the stored media content is in an uncompressed video format for ease of later editing.

As noted above, in one implementation, the recorded media content is captured directly by the camera 126 on the mobile device 110 from the stream of the communication session and saved locally in cache memory 136A for the mobile device 110 rather than the main memory 138B. The uncompressed media content is thus temporarily stored locally in the cache memory 136A of the mobile device 110 during the communication session. As one example, the uncompressed media content can be in a software development kit (SDK) format. In an additional or alternative implementation, the media content can be additionally or alternatively stored in the main memory 136B of the mobile device 110.

The media content is uploaded to the control system 114 (e.g., to the database storage server 160) via the communication network 112. Once the upload has been completed, the control system 114 transmits another control signal to the mobile device 110 to cause the mobile device 110 to delete the media content from the data storage device 136. As such, the control system 114 can mitigate the challenges associated with limited storage capacity of the mobile device 110 described above. In one implementation, the control system 114 can transmit the control signal to trigger the deletion of the media content responsive to the control system 114 determining that the media content was successfully uploaded to the control system 114.

In some implementations, the control system 114 can provide a preview of the recorded media content item to the mobile device 110. For instance, after receiving the media content, the control system 114 can process at least a portion of the media content to render a multimedia file including a video component and an audio component. As examples, the multimedia file can relate to personal biographical information, service information, procedures, technologies, marketing, account management, customer service, sales messages, and/or personal videos for professional career advancement. In additional or alternative examples, the multimedia file can relate to such information in the field of medicine and/or healthcare. In an additional or alternative example, the control system 114 can edit the media content to form the multimedia file. After rendering the multimedia file, the control system 114 can transmit the multimedia file to the mobile device 110 and transmit a control signal to cause the mobile device 110 to play the multimedia file (e.g. using the output devices 118).

The control system 114 can automatically return to the real-time video streams of the communication session (i.e., the video and/or audio content captured by the cameras 126, 152 and microphones 128, 154). As noted above, during the communication session, the control system 114 can transmit to at least one of audio or video to the mobile device 110 during the communication session and the output devices 128 of the mobile device 110 outputs the at least one of audio or video. In this implementation, the control signal causes the output devices 116 of the mobile device 110 to (i) play the multimedia file in a full-screen mode and (ii) when the multimedia file is completely played, automatically return to the communication session.

In this way, the user of the mobile device 110 can evaluate the multimedia file played out on the mobile device 110 and provide feedback (e.g., via the communication session) to the operator of the control device 114. Based on the feedback, the operator can use the control system 114 to further edit the media content and/or approve the media content for storage in the database storage server 160.

The communication session can be terminated by the leave room button 268 shown in FIG. 2E. In the example described above, the recording is terminated by the stop recording button 267, the mobile device 110 responsively prepares the recorded media content for upload, and the mobile device 110 uploads the recorded media content during the communication session. In an alternative example, actuating the leave room button 268 can automatically terminate the recording, cause the mobile device 110 to prepare the recorded media content for upload, and cause the mobile device 110 to establish another connection to the control system 114 (e.g., separate from the initial communication session) to upload the recorded media content. Upon successfully upload, the mobile device 110 can receive a control signal to cause the mobile device 110 to delete the recorded media content.

As noted above, the control system 114 can transmit one or more control signals to the mobile device 110 to facilitate preparing the mobile device 110 and/or the user of the mobile device 110 for the recording of the media content. In one example, the control system 114 can transmit a control signal to control a camera-related parameter of the media content. For instance, the mobile device 110 can be configured to record video at a plurality of resolutions (e.g., 480P, 720P, 1080i, 1080P, 4K, etc.), and the control system 114 can select a resolution from the plurality of resolutions via the control signal. In additional or alternative examples, the control system 114 can transmit a control signal to adjust one or more other camera-related parameters for the recording prior to the recording and/or during the recording. As examples, the camera-related parameter(s) can include an ISO level, a white balance, an exposure, a frame rate, a zoom, a contrast, a saturation level, a tint, a color temperature, and/or an aspect ratio.

The control system 114 can additionally or alternatively transmit a control signal to control an audio-related parameter such as, for example, selecting stereo between mono audio settings and/or selecting a volume level. The control system 114 can further transmit a control signal to control a data format of the media content. For instance, the mobile device 110 can be configured to record and temporarily store media content in a plurality of formats (e.g., MPEG-2/D10, Apple ProRes, DVCPro, H264, etc.) and the control system 114 can select a format from the plurality of formats via the control signal.

In an additional or alternative example, the control system 114 can transmit, to the mobile device 110, a control signal to cause the mobile device 110 to switch between capturing the video content using the rear-facing camera 126A and capturing the video content using the front-facing camera 126B on the mobile device 110 during the communication session. This can be beneficially in a scenario in which the user of the mobile device 110 positioned the mobile device 110 such that the activated camera 126 does not face the user. By remotely switching the between the rear-facing camera 126A and the front-facing camera 126B, the control system 114 conveniently and efficiently activate the camera 126 that is facing the user so that the user is captured in the video content.

In another example, the control system 114 can additionally or alternatively transmit, to the mobile device 110, a control signal to lock at least one setting relating to the camera 126 of the mobile device 110. For instance, the setting can be an auto-exposure setting and/or an auto-focus setting. This can be beneficial because some mobile devices 110 are configured to automatically adjust the auto-exposure and/or auto-focus to address perceived changes to the environmental conditions; however, such adjustments may introduce undesirable artifacts to the recorded media content. By remotely locking these settings, the control system 114 can reduce (or eliminate) such artifacts.

In additional or alternative examples, the control system 114 can receive information from the sensor(s) 129 during the communication session. In one example, the sensor 129 can include gyroscope. The control system 114 can receive sensor data determined by the gyroscope, which indicates a degree of tilt of the mobile device 110. The control system 114 can output (e.g., via the output devices 144) an indication of the degree of tilt of the mobile device 110. In this way, the operator of the control system 114 can evaluate the degree of tilt, determine whether the frame of the video content captured by the camera 126 is level, and, if necessary, provide feedback to the user of the mobile device 110 indicating an adjustment for leveling the frame of the video content.

In one implementation, the control system 114 can transmit a control signal to the mobile device 110 to cause the display device 130 of the mobile device 110 to display an overlaid graphic that can assist the user to make adjustments to the position of the mobile device 110 and/or the position of the user relative to the mobile device 110. For instance, as examples, the overlaid graphic can include the indication of the degree of tilt, an indication (e.g., an arrow) for an adjustment to the tilt of the mobile device 110, a distance away from the mobile device 110 that the user should be positioned at, and/or a center mark for centering the user in the frame of the video.

In an additional or alternative example, the sensor 129 can include a battery level sensor, which can measure and provide an indication of a remaining amount of energy stored in the power storage device 122. The control system 114 can receive, from the mobile device 110, sensor data determined by the battery level sensor, which indicates the remaining amount of energy stored in the power storage device 122. The control system 114 can output (e.g., via the output devices 144) an indication of the remaining amount of energy. In this way, the control system 114 and/or the operator of the control system 114 can determine whether the power storage device 122 is likely to run out of power before the recording is completed. For example, the control system 114 can compare the indicated amount of remaining energy to a threshold value, and if the indicated amount is less than the threshold value, the control system 114 can output a warning to the operator of the control system 114 and/or the mobile device 110 (which can be outputted to the user of the mobile device 110).

According to some examples, the control system 114 can be configured to improve data transfers rates during the communication session by providing the audio content and ceasing to provide the video content from the control system 114 to the mobile device 110. For instance, as noted above, the control system 114 transmits audio and video to the mobile device, and the mobile device 110 outputs to the user the audio and video transmitted by the control system 114 during an initial portion of the communication session. In one implementation, the control system 114 deactivates the camera 152 so that the control system 114 ceases capturing the video and, thus, the control system 114 ceases transmitting the video while continuing to transmit the audio to the mobile device 110. This can reduce the amount of data that is exchanged and received by the mobile device 110.

In another implementation, the control system 114 can continue to capture the video with the camera 152; however, the control system 114 can transmit, to the mobile device 110, a control signal to cause the mobile device 110 to continue outputting the audio and cease outputting the video during a subsequent portion of the communication session. This can reduce the data processing load of the mobile device 110.

Figure 3:
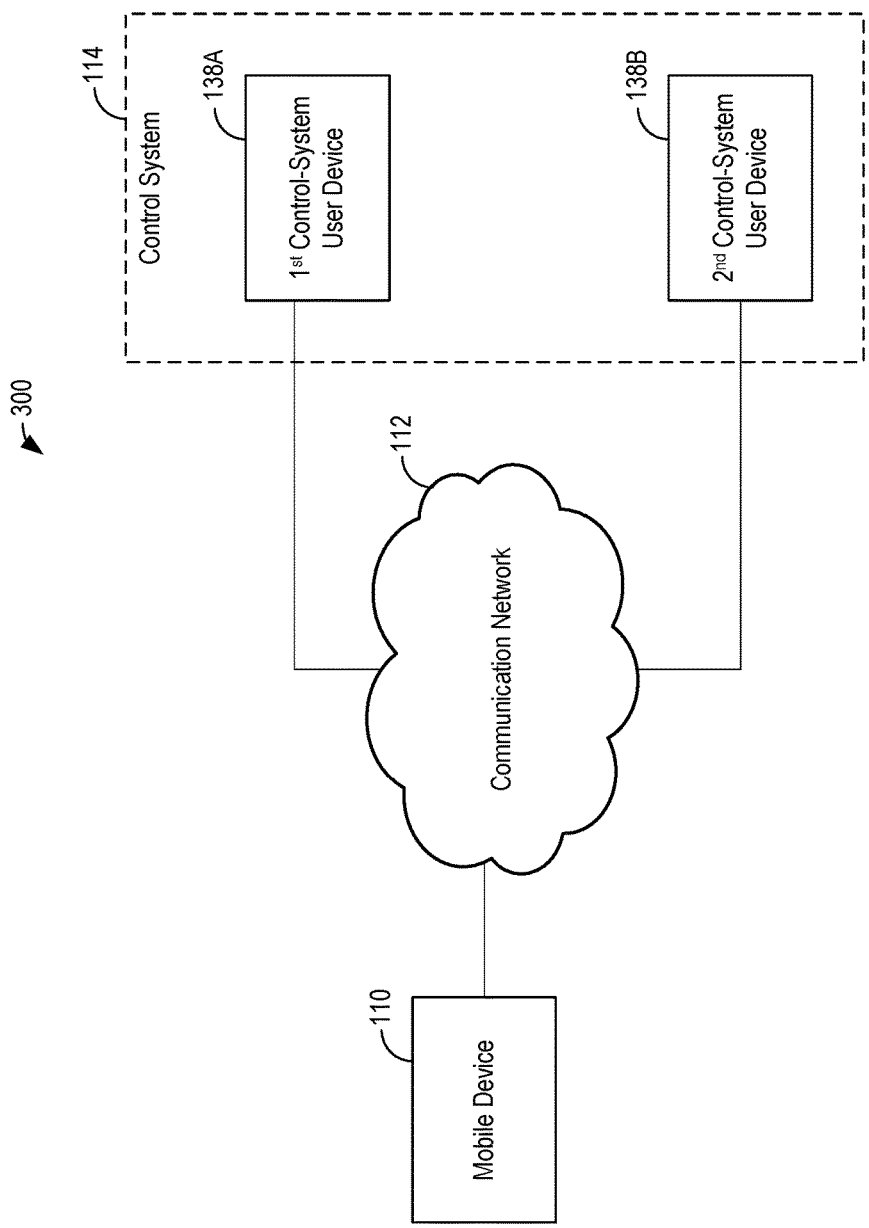
FIG. 3 illustrates a simplified block diagram of a system for recording and storing media content according to an example embodiment.

Referring now to FIG. 3, a simplified block diagram of the system 300 is illustrated according to another example embodiment. The system 300 is substantially the same as the system 100 described and illustrated with respect to FIG. 1; however, the system 300 is depicted as having a first control-system user device 138A and a second control-system user device 138B. In this example, the first control-system user device 138A can establish and participate in the communication session with the mobile device 110 as described above. Whereas, the second control-system user device 138B can be configured to provide approval before triggering the recording is permitted.

For example, during the communication session, the second control-system user device 138 can receive at least one of the audio content and the video content transmitted by the mobile device 110 (i.e., either directly from the mobile device 110 or indirectly via the first control-system user device 138A). The second control-system user device 138B (and/or an operator of the second control-system user device 138B) can then evaluate whether the at least one of the audio content and the video content meets one or more quality criteria. When the at least one of the audio content and the video content does not meet the one or more quality criteria, the second control-system user device 138B transmits a disapproval signal to the first control-system user device 138A to prevent the first control-system user device 138A from triggering the recording. Whereas, when the at least one of the audio content and the video content meets the one or more quality criteria, the second control-system user device 138B transmits an approval signal to the first control-system user device 138A to allow the first control-system user device 138A to trigger the recording.

In one implementation, the first control-system user device 138A can transmit to the second control-system user device 138B a request for the approval signal. In this implementation, the second control-system user device 138B evaluates whether the at least one of the audio for video meets the one or more quality criteria responsive to the request. As examples, the one or more quality criteria can include the types of quality criteria described above including, for instance, criteria relating to whether a subject in the video is centered in a frame of the video.

In the examples described above, the mobile device 110 can upload the media content to the control system 114 before or after the communication session has been terminated. In either example, the mobile device 110 can be configured to provide the control system 114 with a status of the upload during the upload. For example, the mobile device 110 can determine a percentage of the media content that has been uploaded to the database storage server 160 and transmit to the control system 114 a signal indicating the percentage of the media content that has been uploaded. This may be beneficial, for instance, in scenario in which the database storage server 160 is operated by a third party such that the operator of the control system 114 may not have direct knowledge of the data exchange occurring at the database storage server 160. Receiving the signal indicating the status of the upload can facilitate the control system 114 determining that the upload was successful or not.

Referring now to FIGS. 4A-4B, screenshots of user interfaces for managing communication sessions and stored media content are illustrated according to an example embodiment. In FIG. 4A, the user interface 400A includes a listing of video sessions 402. The listing includes a session identification field 410, an employee user name field 412, a mobile user name field 414, a start time field 416, an end time field 418, and a time created field 420 for each of the listing video files. The session identification field 410 shows the session identification associated with the session. The names of the participants are shown in the employee user name field 412 and the mobile user name field 414. Each of the listings includes an action icon 422 that allows a user to list all of the video files associated with the session.

The user interface 400A also includes a series of selection buttons 430 that allows a user to select sessions created for a certain period such as for today, yesterday, this week and this month or all sessions. The session management interface 400A includes a search field 432 allowing a user to search for a specific session. The session management interface 400A includes a create session button 434 that allows a user to initiate a communication session with a mobile user. Selecting the create session button 434 enables a communication session and assign a new ID number to the communication session. The control system 114 can responsively display the interface 200A shown in FIG. 2A.

FIG. 4B is a user interface 400B that can be displayed responsive to a selection of the action icon 422 in the user interface 400 in FIG. 4A. The user interface 400B includes a listing of video files 452 associated with the selected communication session. The listing includes a session identification field 460, an employee user name field 462, a mobile user name field 464, a video name field 466, a video resolution field 468, and a time date stamp field 470 for each of the listing video files.

Each of the media content files includes different control options to modify the media content files via the control system 114. For example, each media content file includes a rename files button 482, a play captured video button 484, a download local version of video file button 486 and a delete button 488. The rename files button 482 allows a user to rename the file. The play video button 484 allows the user to play the video. The download button 486 allows the user to download the video to the control system 114. Additionally, the user interface 400B can include various tools to facilitate post-production video editing of the digital video sequences of the media content (e.g., linear video editing tools, non-linear editing tools, etc.). For example, the user interface 400B can facilitate deleting portions of the media content, re-arranging the order of portions of the media content, adding graphical effects, adding sound effects, filtering the audio content, among other possibilities.

Figure 5:
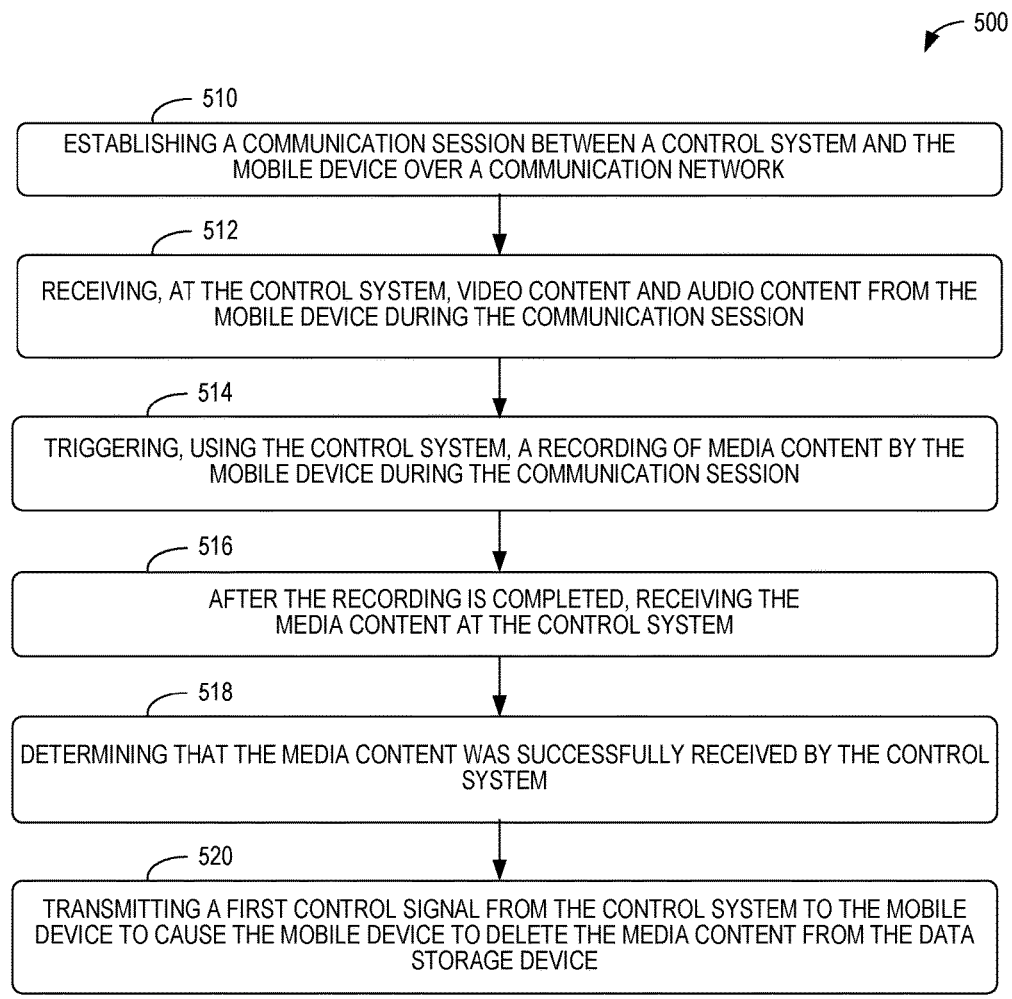
FIG. 5 illustrates a flowchart of a process for determining a power factor according to an example embodiment.

Referring now to FIG. 5, a flowchart for a process 500 of facilitating recording of media content by a mobile device. At block 510, the process 500 includes establishing a communication session between a control system and the mobile device over a communication network. At block 512, the process 500 includes receiving, at the control system, video content and audio content from the mobile device during the communication session. At block 514, the process includes triggering, using the control system, a recording of media content by the mobile device during the communication session. The media content recorded by the mobile device includes a portion of the video content and the audio content. The mobile device stores the media content in a data storage device.

At block 516, after the recording is completed, receiving the media content at the control system. Within examples, the media content can be received at the control system before or after the communication session is terminated. At block 518, the process 500 includes determining that the media content was successfully received by the control system. The process 500 further includes, responsive to determining that the media content was successfully received by the control system at block 518, transmitting a first control signal from the control system to the mobile device to cause the mobile device to delete the media content from the data storage device at block 520.

Figure 6:
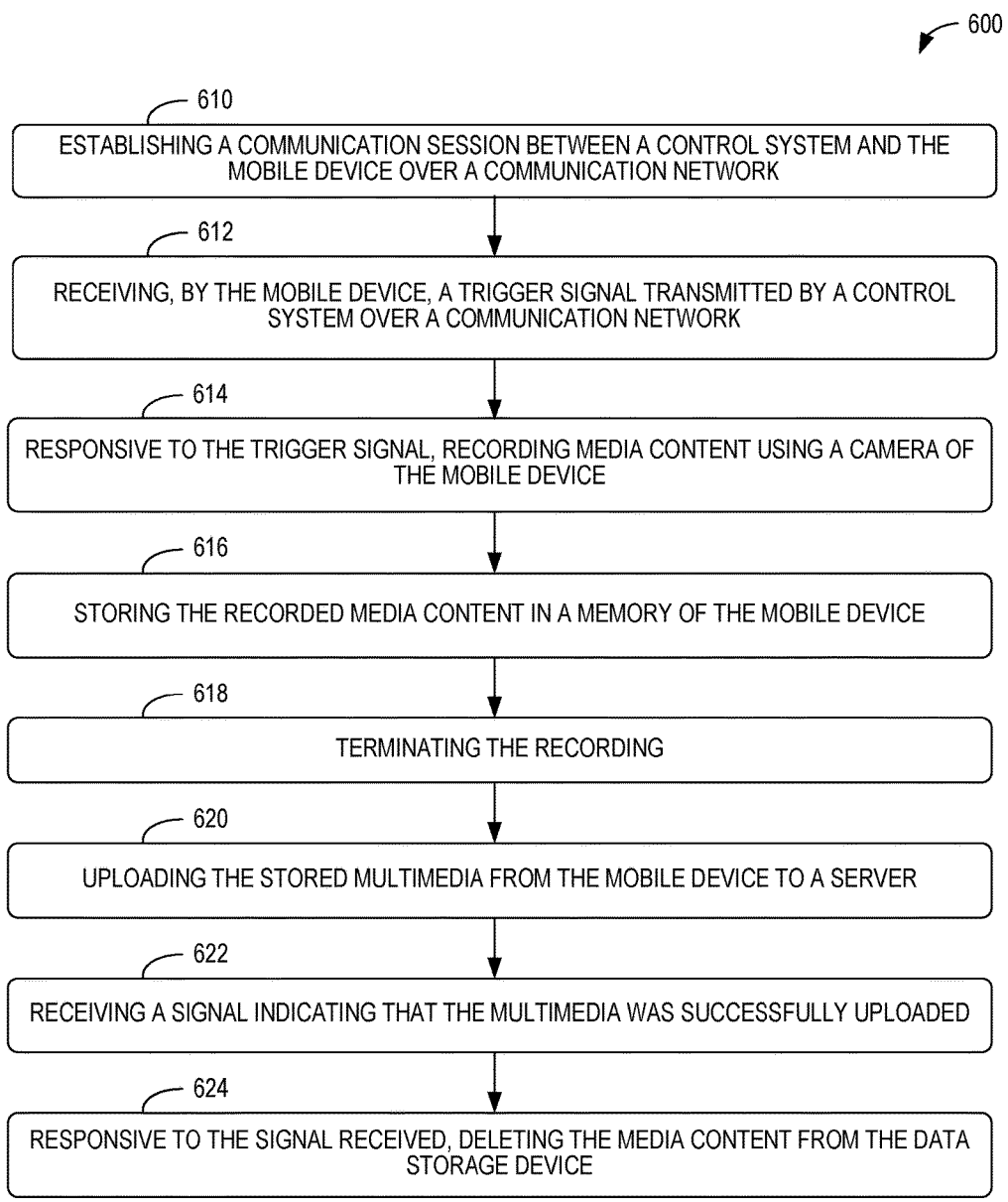
FIG. 6 illustrates a flowchart of a process for determining a power factor according to an example embodiment.

Referring now to FIG. 6, a flowchart for a process 600 of facilitating recording of media content using a mobile device. At block 610, the process 600 includes establishing a communication session between a control system and the mobile device over a communication network. At block 612, the process 600 includes receiving, by the mobile device, a trigger signal transmitted by a control system over a communication network. Responsive to the trigger signal received at block 612, the process 600 includes recording media content using a camera of the mobile device at block 614. The process 600 further includes storing the recorded media content in a memory of the mobile device at block 616 and terminating the recording at block 618. After terminating the recording at block 618, the process 600 includes uploading the stored multimedia from the mobile device to a server at block 620. After uploading the media content to the server at block 620, the process 600 includes receiving a signal indicating that the multimedia was successfully uploaded at block 622. Responsive to the signal received at block 622, the process 600 includes deleting the media content from the memory at block 624

Any of the blocks shown in FIGS. 5-6 may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A method of facilitating recording of media content by a mobile device, comprising:
    establishing a communication session between a control system and the mobile device over a communication network;
    receiving, at the control system, video content and audio content from the mobile device during the communication session;
    triggering, using the control system, a recording of media content by the mobile device during the communication session, wherein the media content recorded by the mobile device includes a portion of the video content and the audio content, wherein the mobile device stores the media content in a data storage device;
    after the recording is completed, receiving the media content at the control system;
    determining that the media content was successfully received by the control system;
    responsive to determining that the media content was successfully received by the control system, transmitting a first control signal from the control system to the mobile device to cause the mobile device to delete the media content from the data storage device; and
    prior to triggering the recording:
        receiving at least one of the audio content and the video content at a second control system,
        evaluating, at the second control system, whether the at least one of the audio content and the video content meets one or more quality criteria, and
        when the at least one of the audio content and the video content meets the one or more quality criteria, transmitting an approval signal from the second control system to the control system to allow the control system to trigger the recording.

2. The method of claim 1, further comprising:
    after receiving the media content, processing at least a portion of the media content to render a multimedia file including a video component and an audio component;
    transmitting the multimedia file from the control system to the mobile device; and
    transmitting a second control signal from the control system to the mobile device to cause the mobile device to play the multimedia file.

3. The method of claim 2, further comprising transmitting at least one of audio or video from the control system to the mobile device during the communication session, wherein an output device of the mobile device outputs the at least one of audio or video transmitted by the control system, and wherein the second control signal causes the output device of the mobile device to (i) play the multimedia file in a full-screen mode and (ii) when the multimedia file is completely played, automatically return to the communication session.

4. The method of claim 1, further comprising transmitting, from the control system to the mobile device, a third control signal to cause the mobile device to switch between capturing the video content using a rear-facing camera and capturing the video content using a front-facing camera on the mobile device during the communication session.

5. The method of claim 1, further comprising:
    transmitting audio and video from the control system to the mobile device, wherein the mobile device outputs to a user the audio and video transmitted by the control system during an initial portion of the communication session; and
    transmitting, from the control system to the mobile device, a fourth control signal to cause the mobile device to continue outputting the audio and cease outputting the video during a subsequent portion of the communication session.

6. The method of claim 1, further comprising, prior to triggering the recording:
    when the at least one of the audio content and the video content does not meet the one or more quality criteria, transmitting a disapproval signal from the second control system to the control system to prevent the control system from triggering the recording.

7. The method of claim 1, further comprising transmitting, from the control system to the second control system, a request for the approval signal, wherein evaluating, at the second control system, whether the at least one of the audio for video meets the one or more quality criteria responsive to the request.

8. The method of claim 1, wherein evaluating, at the second control system, whether the at least one of the audio for video meets the one or more quality criteria comprises determining whether a subject in the video is centered in a frame of the video.

9. The method of claim 1, further comprising transmitting, from the control system to the mobile device, a fifth control signal to lock at least one setting relating to a camera of the mobile device.

10. The method of claim 9, wherein the at least one setting is at least one setting of the group consisting of: an auto-exposure setting or an auto-focus setting.

11. The method of claim 1, further comprising:
    receiving, at the control system, sensor data determined by a gyroscope of the mobile device, wherein the sensor data indicates a degree of tilt of the mobile device; and
    outputting, using an output device of the control system, an indication of the degree of tilt of the mobile device.

12. The method of claim 1, further comprising:
    receiving, at the control system, a battery signal indicating an amount of remaining energy stored in the battery of the mobile device during the communication session; and
    outputting, using an output device of the control system, an indication of the amount of remaining energy stored in the battery of the mobile device.

13. A method of recording media content using a mobile device, comprising:

establishing a communication session between a control system and the mobile device over a communication network;
receiving, by a mobile device, a trigger signal transmitted by a control system over a communication network;
responsive to the trigger signal, recording media content using a camera of the mobile device;
storing the recorded media content in a memory of the mobile device;
terminating the recording;
after terminating the recording, uploading the stored media content from the mobile device to a server;
after uploading the media content to the server, receiving a signal indicating that the media content was successfully uploaded; and
responsive to the signal, deleting the media content from the memory,
wherein receiving, by the mobile device, the trigger signal is responsive to:
at least one of audio content and video content being transmitted to a second control system,
the second control system evaluating whether the at least one of the audio content and the video content meets one or more quality criteria, and
when the at least one of the audio content and the video content meets the one or more quality criteria, the second control system transmitting an approval signal to the control system to allow the control system to trigger the recording.

14. The method of claim 13, further comprising, while uploading the media content:
determining a percentage of the media content that has been uploaded to the server; and
transmitting, by the mobile device, a signal indicating the percentage of the media content that has been uploaded.

15. The method of claim 13, further comprising:
after uploading the media content, receiving from the control system a multimedia file including a video component and an audio component;
outputting, on a display of the mobile device, the multimedia file in a full screen mode of the display; and
responsive to the multimedia file being completely played, automatically returning the display to video of the communication session.

16. The method of claim 13, further comprising:
receiving, from the control system, a control signal to cause the mobile device;
responsive to the control signal, switching between capturing video content using a rear-facing camera and capturing the video content using a front-facing camera on the mobile device during the communication session.

17. The method of claim 13, further comprising:
receiving, from the control system, a control signal; and
responsive to the control signal, locking at least one setting relating to a camera of the mobile device,
wherein the at least one setting is at least one setting of the group consisting of: an auto-exposure setting or an auto-focus setting.

18. A control system for recording of media content by a mobile device, comprising:
a camera configured to capture video;
a microphone configured to capture audio; and
a processor communicatively coupled to the camera and the microphone, wherein the processor is configured to:
establish a communication session between the control system and the mobile device over a communication network,
transmit, to the mobile device, the video captured by the camera and the audio captured by the microphone during the communication session,
receive video content and audio content from the mobile device during the communication session,
trigger a recording of media content by the mobile device during the communication session, wherein the media content recorded by the mobile device includes a portion of the video content and the audio content, wherein the mobile device stores the media content in a data storage device,
after the recording is completed, receive the media content,
responsive to the media content being received, transmit a control signal from the control system to the mobile device to cause the mobile device to delete the media content from the data storage device, and
prior to triggering the recording:
receive at least one of the audio content and the video content at a second control system,
evaluate, at the second control system, whether the at least one of the audio content and the video content meets one or more quality criteria, and
when the at least one of the audio content and the video content meets the one or more quality criteria, transmit an approval signal from the second control system to the control system to allow the control system to trigger the recording.

19. The system of claim 18, wherein the processor is further configured to:
after receiving the media content, process at least a portion of the media content to render a multimedia file including a video component and an audio component;
transmit the multimedia file from the control system to the mobile device; and
transmit a second control signal from the control system to the mobile device to cause the mobile device to play the multimedia file.

20. The system of claim 19, wherein the processor is further configured to transmit at least one of audio or video from the control system to the mobile device during the communication session,
wherein an output device of the mobile device outputs the at least one of audio or video transmitted by the control system, and
wherein the second control signal causes the output device of the mobile device to (i) play the multimedia file in a full-screen mode and (ii) when the multimedia file is completely played, automatically return to the communication session.

* * * * *